(12) United States Patent
Mendes

(10) Patent No.: US 8,631,821 B2
(45) Date of Patent: Jan. 21, 2014

(54) FLEXIBLE SUMP

(75) Inventor: Christophe Mendes, Saint Ouen du Tilleul (FR)

(73) Assignee: Aerazur S.A. (FR)

(*) Notice: Subject to any disclaimer, the term of this patent is extended or adjusted under 35 U.S.C. 154(b) by 92 days.

(21) Appl. No.: 13/277,371

(22) Filed: Oct. 20, 2011

(65) Prior Publication Data

US 2012/0097271 A1 Apr. 26, 2012

Related U.S. Application Data

(60) Provisional application No. 61/394,825, filed on Oct. 20, 2010.

(51) Int. Cl.
*B67D 7/58* (2010.01)
*F16D 31/02* (2006.01)
*B65D 88/12* (2006.01)

(52) U.S. Cl.
USPC .............. 137/565.37; 137/351; 220/562

(58) Field of Classification Search
USPC ............. 137/351, 565.37, 565.34, 565.17; 184/1.5, 106; 123/198 DA, 198 E, 509; 220/562, 571, 57
See application file for complete search history.

(56) References Cited

U.S. PATENT DOCUMENTS

| | | |
|---|---|---|
| 2,332,362 A | 10/1943 | Bartow |
| 2,391,477 A | 12/1945 | Phillipe |
| 2,807,395 A | 9/1957 | Korte |
| 3,026,070 A | 3/1962 | Sutton et al. |
| 3,511,515 A | 5/1970 | Cline et al. |
| 3,537,732 A | 11/1970 | Cook |
| 3,697,093 A | 10/1972 | Cadiou |
| 4,212,488 A | 7/1980 | Cook |
| 4,223,899 A | 9/1980 | Krieger |
| 4,449,493 A * | 5/1984 | Kopec et al. .............. 123/196 A |
| 4,561,977 A | 12/1985 | Sasaki |

(Continued)

FOREIGN PATENT DOCUMENTS

| | | |
|---|---|---|
| DE | 3408520 A1 | 9/1984 |
| EP | 0976600 A2 | 2/2000 |
| GB | 2273478 A | 6/1994 |
| JP | 3057872 A | 3/1991 |

OTHER PUBLICATIONS

International Search Report and Written Opinion dated May 23, 2012 in related Application No. PCT/IB2011/002515.
Aircraft Powerplant Free Online Private Pilot Ground School—The things you need to know for take-off . . . http://www.free-online-private-pilot-ground-school.com/aircraft-powerplant.html pp. 1-24 (Oct. 13, 2011).
SumpThis, General Aviation New Aviation Safety and Management Consultants "Quest for Positive Detection of Fuel Contamination" http://sumpthis.com/ pp. 1-4 (Oct. 13, 2011).
English translation of Office Action dated Aug. 1, 2013 in Russian Application No. 2013122749.
International Preliminary Report on Patentability dated May 2, 2013 in related Application No. PCT/IB2011/002515.

*Primary Examiner* — John Rivell
*Assistant Examiner* — Michael R Reid
(74) *Attorney, Agent, or Firm* — Dean W. Russell; Tiffany L. Williams; Kilpatrick Townsend & Stockton LLP

(57) ABSTRACT

Described are flexible sumps including a sump cavity comprising flexible walls and a platform coupled to an upper edge of the sump cavity. Some examples of the flexible sumps may also include a flange having a coupling section and an exposed section and/or an interface coupled to a lower surface of the sump cavity. In some examples, at least two coupling tabs are coupled to the platform and are configured to couple the platform to a lower surface of a fuel structure, which may include a sump aperture that is configured to surround the flexible walls of the sump cavity when the platform is coupled to the lower surface of the fuel structure.

22 Claims, 5 Drawing Sheets

(56) References Cited

U.S. PATENT DOCUMENTS

| | | |
|---|---|---|
| 5,518,017 A | 5/1996 | Snook, Jr. |
| 5,647,329 A | 7/1997 | Bucci et al. |
| 5,673,940 A | 10/1997 | Gaisford et al. |
| 5,787,865 A | 8/1998 | Harris et al. |
| 5,853,103 A | 12/1998 | Yamazaki |
| 6,176,260 B1 | 1/2001 | Hahner et al. |
| 6,907,865 B1 | 6/2005 | Hanby |
| 2007/0051740 A1 | 3/2007 | Huang |
| 2008/0199759 A1 | 8/2008 | Adams et al. |
| 2009/0133948 A1 | 5/2009 | Ijaz et al. |

* cited by examiner

US 8,631,821 B2

FLEXIBLE SUMP

CROSS REFERENCE TO RELATED APPLICATIONS

This application is related to and claims priority benefits from U.S. Provisional Application Ser. No. 61/394,825, filed on Oct. 20, 2010, entitled CRASHWORTHY FLEXIBLE SUMP. The '825 application is hereby incorporated in its entirety by this reference.

FIELD OF THE INVENTION

The field of the invention relates to sumps and more particularly, although not necessarily exclusively, to flexible sumps intended to couple to fuel structures, such as fuel tanks, fuel cells, and fuel bladders.

BACKGROUND

Traditionally, engines in aircraft, including airplanes and helicopters, as well as land vehicles, require an uninterrupted flow of clean fuel from fuel structures, such as fuel tanks, fuel cells, fuel bladders, and the like, to the engines for proper operation. These systems commonly include fuel systems that are designed to prevent water or other contaminants from entering the engine during operation. For example, many of these systems rely on the fact that most fuels, such as jet fuel, gasoline, diesel, ethanol, and other similar fuels, are less dense than water and other contaminants. Thus, the water or other contaminant will separate from the fuel and settle to the bottom of the fuel container.

In many cases, a sump is added to the bottom of the fuel container as a location to collect the water or other contaminant. The sump includes a sump cavity that typically forms the lowest point in a lower surface of the fuel container. A drain valve or bleed valve may be included in a lower surface of the sump cavity as a mechanism to remove the water or other contaminants that may have settled into the sump cavity.

The sumps are traditionally formed of metallic or other rigid materials, which are chosen to provide structural integrity and rigidity to the sump to withstand the force of an impact. Because the sump forms the lowest surface in the fuel tank, the sump is positioned in a location that may protrude from a lower surface of the aircraft or land vehicle. This position often subjects the sump to damage when the aircraft or vehicle suffers a crash impact. In many cases, the sump is not strong enough to withstand the force of impact, which may result in undesirable fuel leaks during impact caused by cracks or other structural failures. Accordingly, it may be desirable to develop a flexible sump design that may accept high deformation without risks of leaks to maintain the integrity of the fuel tank in the event of a crash impact.

SUMMARY

Embodiments of the present invention include a flexible sump comprising a sump cavity having flexible walls and a platform coupled to an upper edge of the sump cavity. Some embodiments may include a flange comprising a coupling section and an exposed section and/or an interface coupled to a lower surface of the sump cavity.

In other embodiments, at least two coupling tabs may be coupled to the platform and configured to couple the platform to a lower surface of a fuel structure, which may include a sump aperture that is configured to surround the flexible walls of the sump cavity when the platform is coupled to the lower surface of the fuel structure. The lower surface of the sump cavity may be positioned below the lower surface of the fuel structure when the platform is coupled to the lower surface of the fuel structure. The lower surface of the sump cavity may also be positioned below a lower surface of a vehicle structure when the fuel structure is coupled to the lower surface of the vehicle structure.

In some embodiments, the flexible walls and/or the lower surface of the sump cavity may be configured to bend when a force is applied to a lower surface of the sump cavity, so that the lower surface of the sump cavity is positioned at least partially within the fuel structure.

Other embodiments of the present invention include a fuel structure comprising a lower surface having a sump aperture, a flexible sump comprising a sump cavity having flexible walls and a flexible lower surface, wherein the sump cavity is positioned within the sump aperture so that the flexible lower surface is positioned below the lower surface of the fuel structure, an interface coupled to the flexible lower surface of the sump cavity, and a platform comprising coupling tabs, wherein the platform is coupled to an upper edge of the sump cavity and wherein the coupling tabs couple the platform to the lower surface of the fuel structure. In other embodiments, the fuel structure may further comprise a flange with a coupling section and an exposed section and a support structure, wherein the support structure is coupled to the coupling section of the flange and the platform.

DETAILED DESCRIPTION

Figure 1:
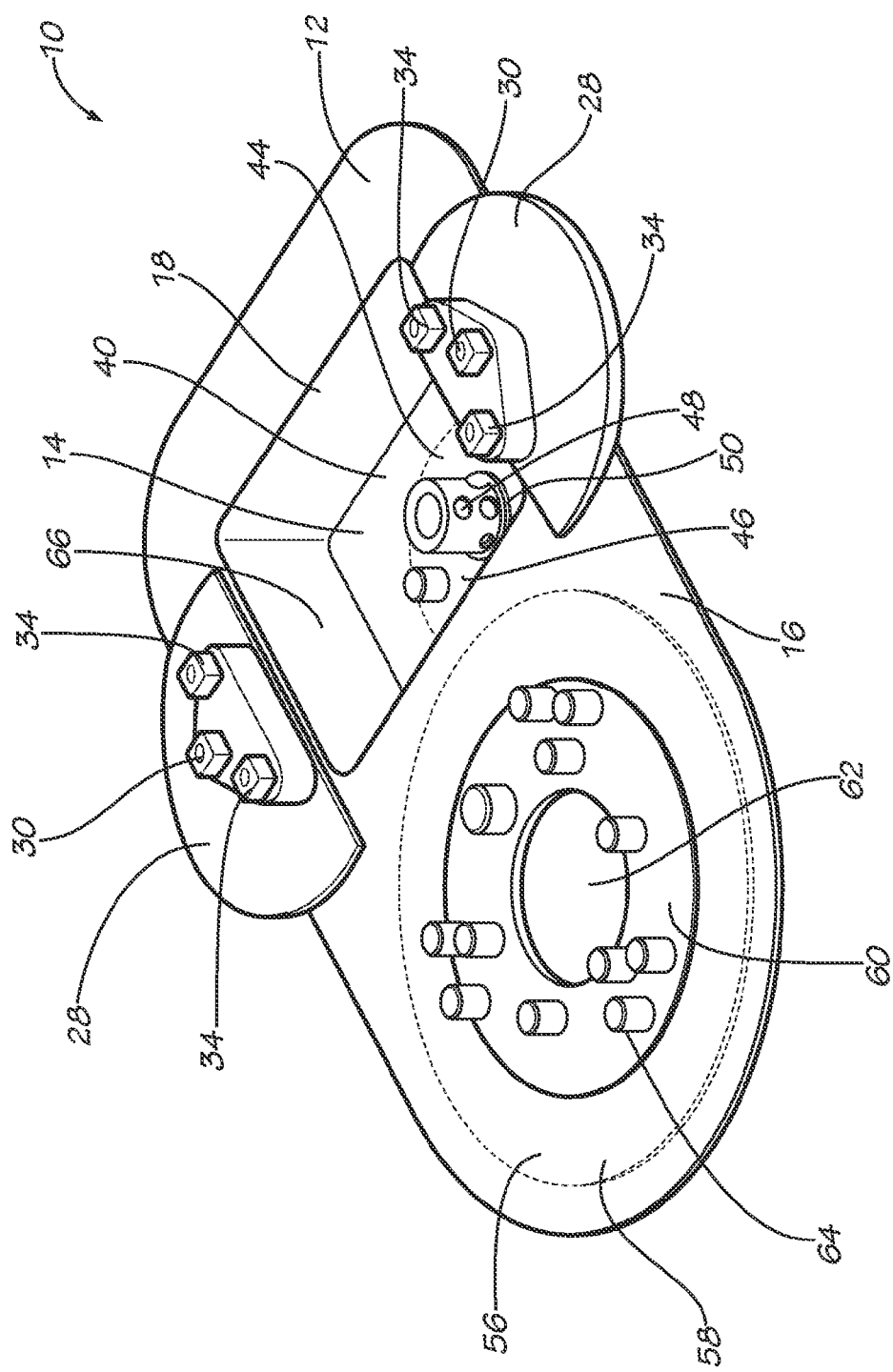
FIG. 1 is a top perspective view of a flexible sump according to certain embodiments of the present invention.
Figure 2:
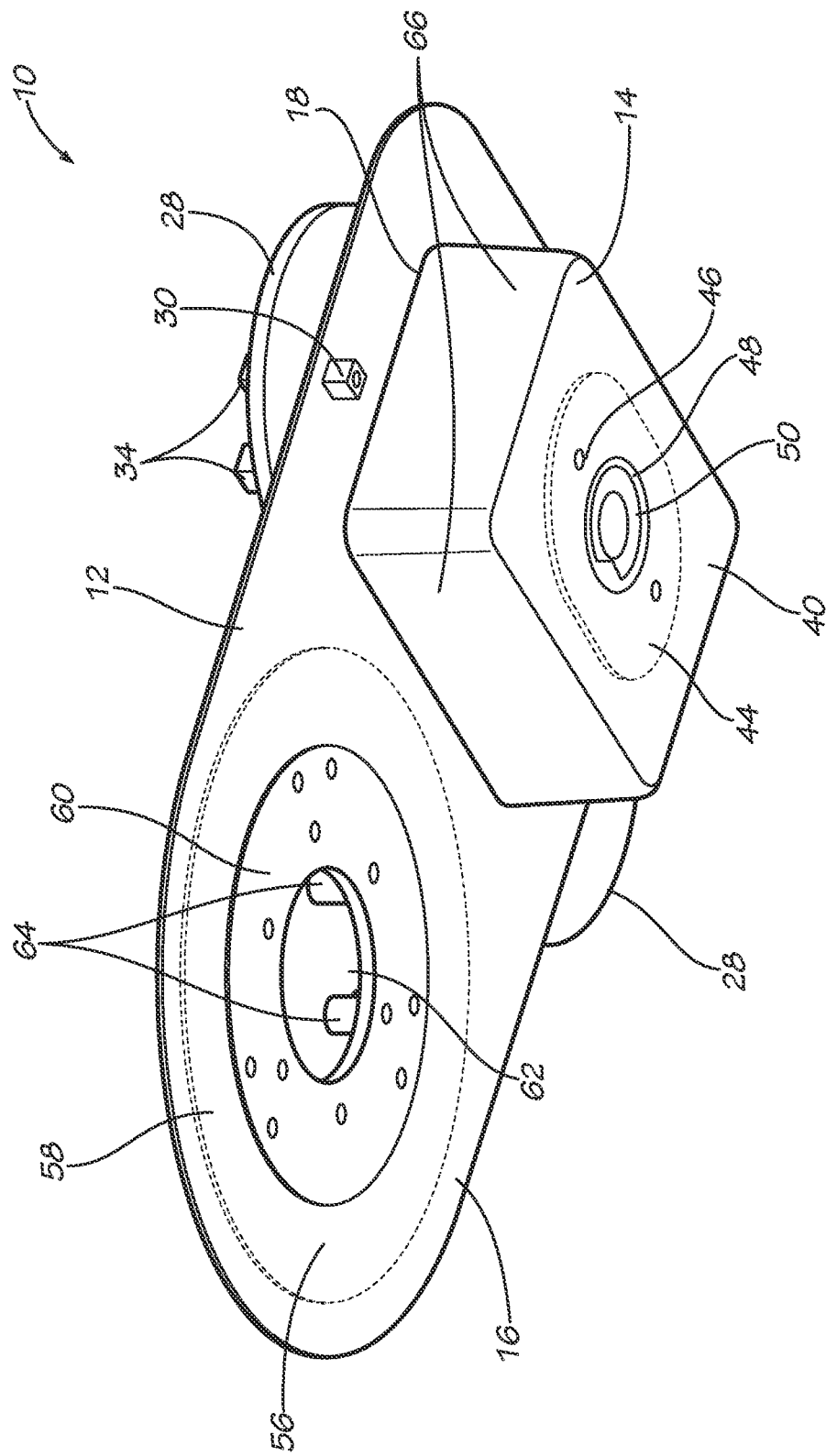
FIG. 2 is a bottom perspective view of the flexible sump of FIG. 1.

Embodiments of the invention provide flexible sumps that are crashworthy. While the flexible sumps are discussed for use with aircraft and land vehicle fuel systems, they are by no means so limited. Rather, embodiments of the flexible sumps may be used in fuel systems of any type or otherwise as desired.

FIGS. 1-5 illustrate embodiments of a flexible sump 10. As shown in FIGS. 1-5, the flexible sump 10 may comprise a platform 12 and a sump cavity 14. In some embodiments, the flexible sump 10 may further comprise an additional support structure 16 that is coupled to the platform 12.

In some embodiments, the platform 12 may surround an upper edge 18 of the sump cavity 14. In the embodiments illustrated in FIGS. 1-5, the platform 12 is integrally formed with the sump cavity 14 and/or with the support structure 16 by a molding process. However, one of ordinary skill in the relevant art will understand that the platform 12 may be coupled to the sump cavity 14 and/or the support structure 16 through any suitable process or method. The platform 12, the sump cavity 14, and/or the support structure 16 may be formed of a flexible material including but not limited to elastomeric materials, rubber, fabrics, or other suitable flexible materials.

In some embodiments, the sump cavity 14 and/or the support structure 16 may include metallic components, such as an interface 44 and/or a flange 56. In these embodiments, the flexible components 12, 14, 16 may be integrally molded around the metallic components 44, 56 to form the flexible sump 10, which may also be molded to or otherwise attached to a lower surface 22 of a fuel structure 24. In these embodiments, the fuel structure 24 may be also be formed of flexible materials including but not limited to elastomeric materials, rubber, fabrics, or other suitable flexible materials.

In some embodiments, the platform 12 may have a substantially rectilinear surface shape and a generally flat profile. However, one of ordinary skill in the relevant art will understand that the platform 12 may have any appropriate profile shape including but not limited to flat, sloping, curved, or other suitable shape. Likewise, one of ordinary skill in the relevant art will understand that the platform 12 may have any appropriate surface shape including but not limited to rectilinear, trapezoidal, circular, or other suitable shape. In the embodiments where the platform 12 is formed of flexible materials, the overall shapes of the profile and surface may be adjusted as needed to contour the surface to which it is coupled.

Figure 3:
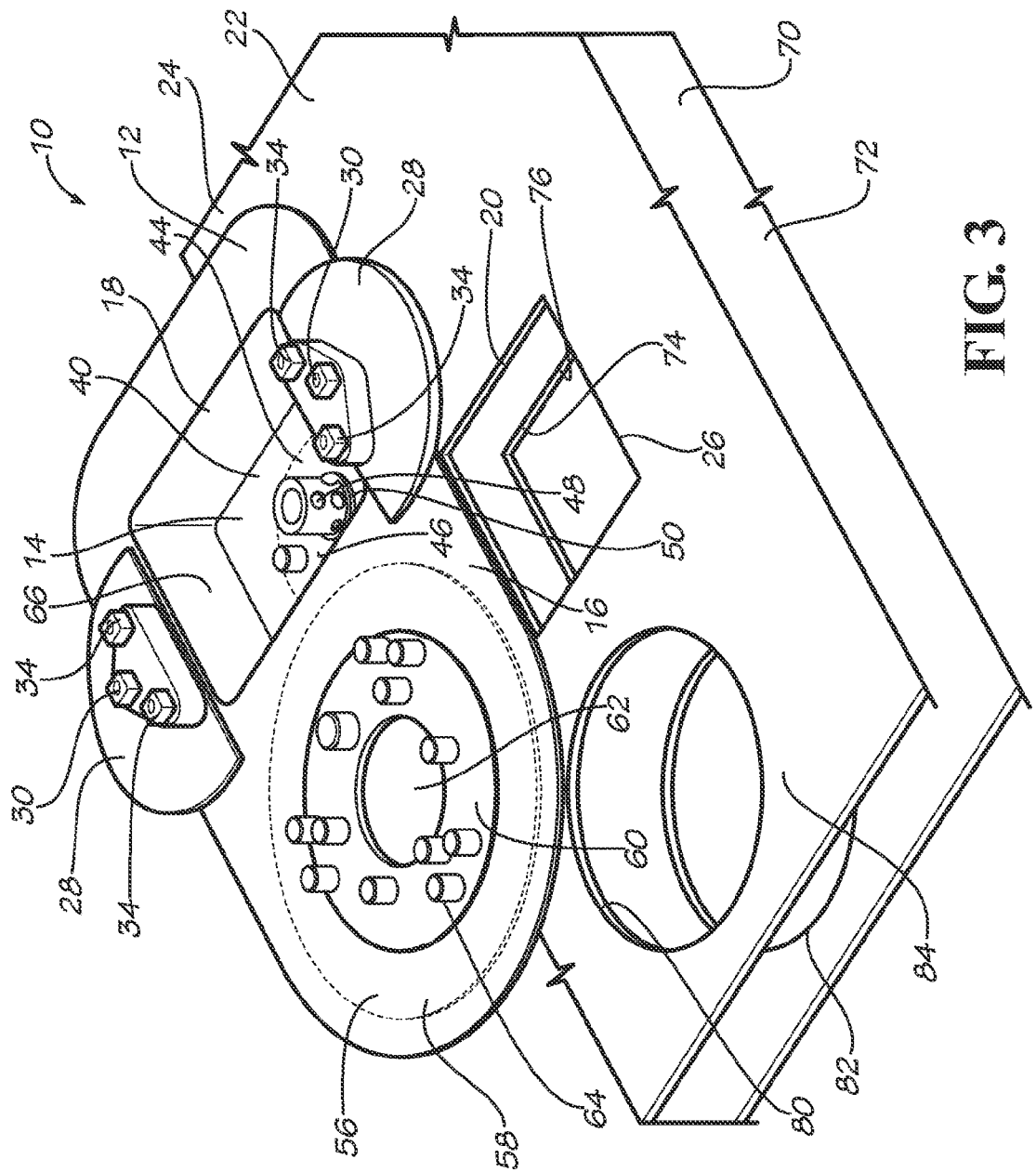
FIG. 3 is an exploded top perspective view of the flexible sump of FIG. 1 in combination with a fuel structure and a vehicle structure.
Figure 4:
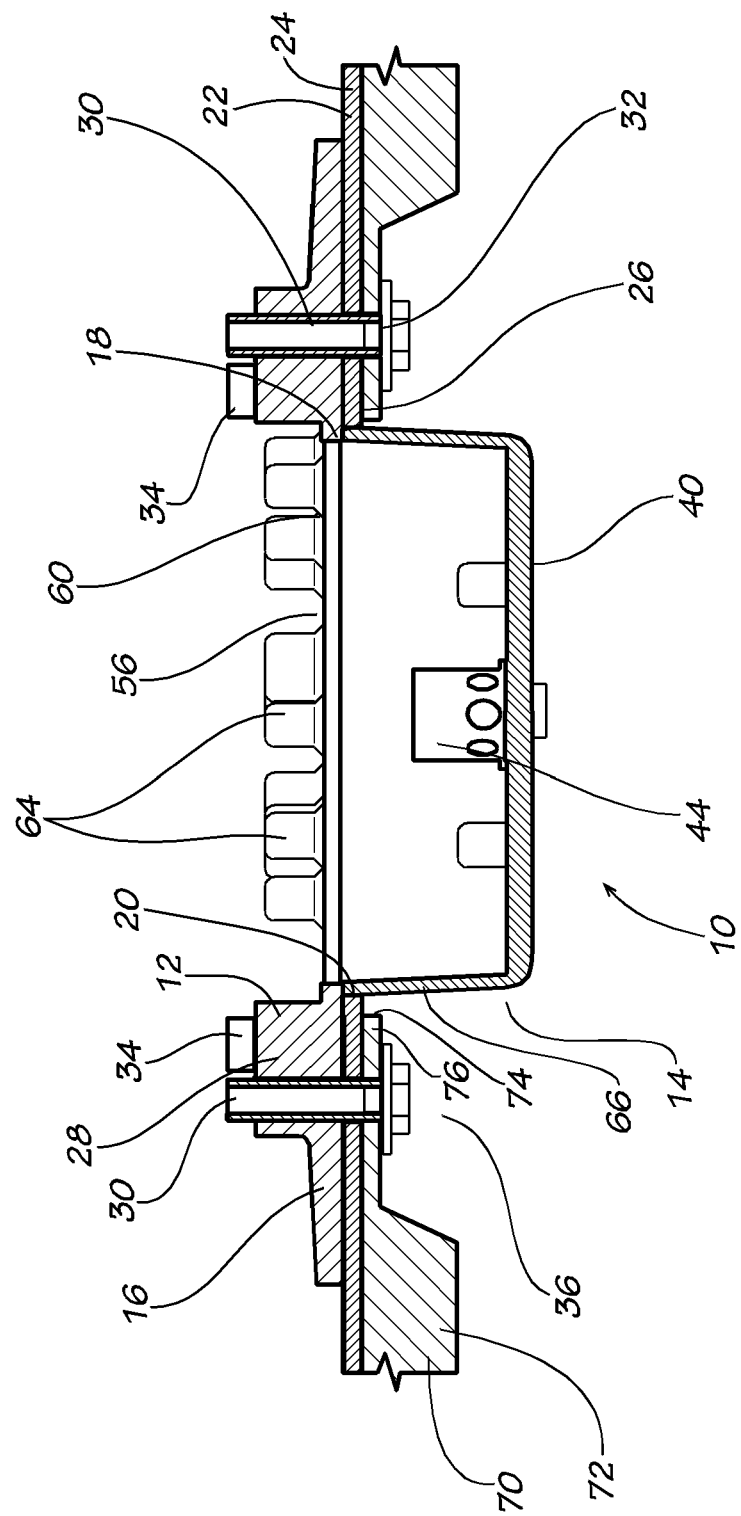
FIG. 4 is a cross-sectional view of the flexible sump of FIG. 1 in a non-impacted position.
Figure 5:
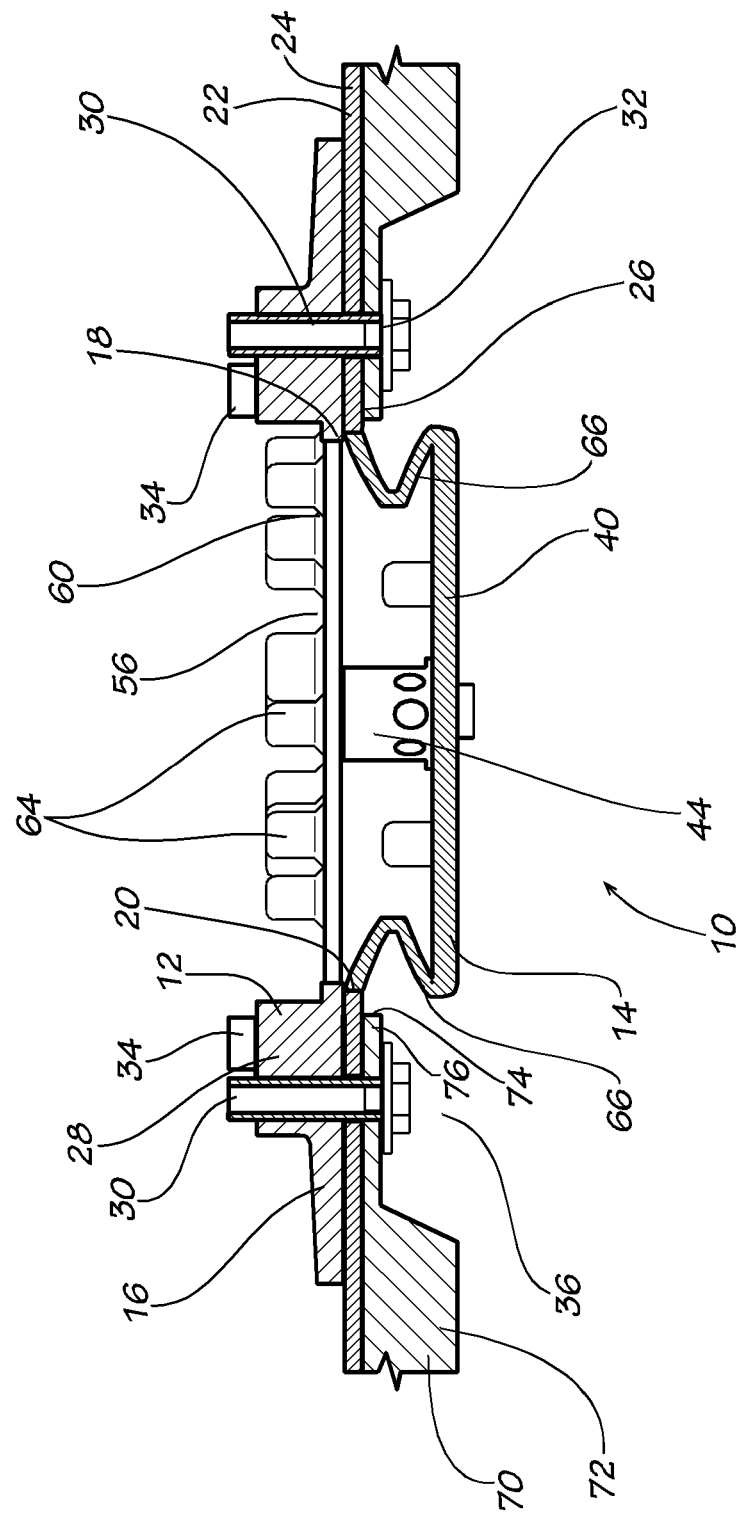
FIG. 5 is a cross-sectional view of the flexible sump of FIG. 1 in an impacted position.

In some embodiments, as shown in FIGS. 3-5, the sump cavity 14 is configured to mate with a sump aperture 20 in a lower surface 22 of a fuel structure 24. In other embodiments, the sump cavity 14 may be configured to mate with a fuel tank, fuel cell, or other suitable container.

In these embodiments, the platform 12 is shaped to overlap at least a portion of an outer edge 26 of the sump aperture 20. The platform 12 may have any suitable shape that allows the sump cavity 14 to pass through the sump aperture 20, while preventing the platform 12 from passing through the sump aperture 20. In these embodiments, the platform 12 may further comprise coupling tabs 28 that are mounted on or integrally formed with at least two sides of the platform 12. One of ordinary skill in the relevant art will understand that the coupling tabs 28 may be coupled to the platform 12 via glue or other chemical process. The coupling tabs 28 may provide coupling locations 30 for mechanical fasteners 32 to maintain the flexible sump 10 in position around the outer edge 26 of the sump aperture 20. The coupling tabs 28 may also be formed of a flexible material including but not limited to elastomeric materials, rubber, fabrics, or other suitable flexible materials. The platform 12 may also be coupled to the portion of the outer edge 26 via any suitable mechanical or chemical process including but not limited to screws, bolts, or other suitable mechanism.

In some embodiments, the coupling tabs 28 may, but not necessarily, include mechanical coupling projections 34 that provide locations for a component to be mounted to the flexible sump 10. Examples of components that may be mounted to these locations include but are not limited to a fuel pump, internal gauges, hose/pipe attachment(s), or other internal components used for the fuel system, or other suitable component.

The fuel structure 24 may be positioned within a vehicle structure 70, which may include but is not limited to aircraft, land vehicles, or other vehicles that include a fuel system. The lower surface 22 of the fuel structure 24 is positioned adjacent a lower surface 72 of the vehicle structure 70. In some embodiments, the lower surface 72 may include an aperture 74. In these embodiments, as shown in FIGS. 3-5, the fuel structure 24 is positioned so that the sump cavity 14 is positioned within the aperture 74.

In some embodiments, as shown in FIGS. 1-5, the sump cavity 14 has a substantially rectilinear shape. However, one of ordinary skill in the relevant art will understand that the sump cavity 14 may have any appropriate shape including but not limited to rectilinear, trapezoidal, circular, or other suitable shape. In some embodiments, the sump cavity 14 may be shaped to substantially conform to the shape of the aperture 74 of the vehicle structure 70.

In some embodiments, as shown in FIGS. 3-5, the aperture 74 is formed of walls 76 that are configured to contact at least a portion of walls 66 of the sump cavity 14. In some embodiments, the thickness of the walls 76 may be less than the thickness of the lower surface 72 in other regions. As a result, a recessed area 36 may be formed below the aperture 74. In other embodiments, the thickness of the walls 76 may be similar or substantially the same as the thickness of the lower surface 72 in other regions. In these embodiments, the recessed area 36 is not positioned below the aperture 74.

In these embodiments, the sump cavity 14 may have a depth that is configured according to the fuel system requirements, such as an estimate of the volume of water or other contaminants in the fuel. In these embodiments, the height of the sump cavity 14 may be adjusted as needed, depending on the particular fuel system requirements. For example, the dimensions of the sump cavity 14 may be configured so that the sump cavity 14 may have a volume that approximates a predetermined volume of anticipated contaminants. In many cases, fuel structures of a certain volume may be estimated to contain a predetermined volume of water or other contaminants that may be introduced into the fuel structure 24 through a variety of sources. Because water typically settles to the bottom of the fuel structure 24, the sump cavity 14 may be sized to collect the estimated volume of water. However, one of ordinary skill in the relevant art will understand that any suitable dimensions of the sump cavity 14 may be used, which may or may not correlate to an estimated volume of water or other contaminants. In these embodiments, as shown in FIGS. 4-5, a lower surface 40 of the sump cavity 14 is the lowest point of the fuel structure 24.

In some cases, in order to satisfy the fuel system requirements without impacting the dimensions of the sump cavity 14 that are bounded by the size of the aperture 74, the walls 66 of the sump cavity 14 may be lengthened so that the lower surface 40 of the sump cavity 14 is positioned within the aperture 74 of the vehicle structure 70. In other embodiments, the walls 66 may be further lengthened so that the lower surface 40 is positioned below the aperture 74. In the embodiments where the recessed area 36 is positioned below the aperture 74, the lower surface 40 may be positioned within the recessed area 36. In other embodiments, or in the embodiments that do not include the recessed area 36, the walls 66 may be further lengthened so that the lower surface 40 is positioned below the lower surface 72.

In certain embodiments, as shown in FIGS. 1-5, the lower surface 40 of the sump cavity 14 may also include an interface 44 that provides a location for a component to be mounted to the lower surface 40 of the sump cavity 14. The interface 44 may be formed of metal, plastic, or other suitable non-corrosive materials. In some embodiments, the interface 44 may include a flange 46 and a receptacle 48. The flange 46 may be sandwiched within the lower surface 40 of the sump cavity 14. For example, as shown in FIG. 1-5 or 2-5, the sump cavity 14 may be molded around the flange 46 so that the lower surface 40 surrounds both sides of the flange 46. In these embodiments, the flexible material of the sump cavity 14 may provide additional protection to the flange 46 by enclosing the surfaces of the flange 46. In other embodiments, the flange 46 may be coupled to the lower surface 40 via any suitable chemical process including but not limited to gluing, molding, or other suitable mechanism.

The receptacle 48 in the interface 44 forms an aperture 50 in the flange 46. In some embodiments, the lower surface 40 of the sump cavity 14 does not surround this portion of the interface 44 so that the receptacle 48 is configured to provide access to the sump cavity 14 from outside the fuel structure 24. An inner surface of the receptacle 48 may be threaded to allow a similarly threaded component to releasably couple to the receptacle 48. However, one of ordinary skill in the relevant art will understand that any suitable mechanical or chemical fasteners may be used to couple a component to the receptacle 48 including but not limited to rivets, screws, bolts, glue, or other suitable mechanism.

In some embodiments, a bleed valve may be coupled to the receptacle 48 to provide an access point to remove water from the sump cavity 14, for fuel sampling, or other suitable purposes. Other suitable components that may be coupled to the receptacle 48 include but are not limited to a drain valve, a plug, a water drain valve, a temperature sensor, or other suitable component.

In some embodiments, as shown in FIGS. 1-5, the support structure 16 may further include the flange 56 that provides a location for a component to be mounted to the flexible sump 10. Alternatively, the flange 56 may provide an access point to the fuel structure 24. In these embodiments, the flange 56 may be formed of metal, plastic, or other suitable non-corrosive materials. In some embodiments, the flange 56 may include a coupling section 58 and an exposed section 60. The support structure 16 may be molded around the coupling section 58 so that the support structure 16 surrounds both sides of the coupling section 58. In these embodiments, the flexible material of the support structure 16 may provide additional protection to the flange 56 by enclosing the coupling section 58 of the flange 56. In other embodiments, the flange 56 may be coupled to the support structure 16 via any suitable chemical process including but not limited to gluing, molding, or other suitable mechanism.

In some embodiments, the support structure 16 may have a substantially round surface shape and a generally flat profile. However, one of ordinary skill in the relevant art will understand that the support structure 16 may have any appropriate profile shape including but not limited to flat, sloping, curved, or other suitable shape. Likewise, one of ordinary skill in the relevant art will understand that the support structure 16 may have any appropriate surface shape including but not limited to rectilinear, trapezoidal, circular, or other suitable shape. In the embodiments where the support structure 16 is formed of flexible materials, the overall shapes of the profile and surface may be adjusted as needed to contour the surface to which it is coupled.

In some embodiments, as shown in FIGS. 3-5, the exposed section 60 of the flange 56 is configured to mate with a flange aperture 80 in the lower surface 22 of the fuel structure 24. In other embodiments, the exposed section 60 may be configured to mate with a fuel tank, fuel cell, or other suitable container. In these embodiments, the lower surface 22 of the fuel structure 24 may be positioned adjacent the lower surface 72 of the vehicle structure 70 so that the flange aperture 80 is substantially aligned with an aperture 82 in the lower surface 72 of the vehicle structure 70.

In these embodiments, the coupling section 58 is shaped to overlap at least a portion of an outer edge 84 of the flange aperture 80. The coupling section 58 may have any suitable shape that allows at least a portion of the exposed section 60 to be accessible via the apertures 80, 82, while preventing the flange 56 from passing through the apertures 80, 82. In these embodiments, the coupling section 58 (which may be enclosed by a portion of the support structure 16) may be coupled to the portion of the outer edge 84 via any suitable chemical process including but not limited to gluing or other suitable mechanism.

In certain embodiments, as shown in FIGS. 3-5, the exposed section 60 includes an aperture 62 that is configured to provide access to the interior of the fuel structure 24 from outside the fuel structure 24 and the vehicle structure 70. In some embodiments, the flange 56 may be configured to provide support for a fuel pump, a fuel probe, or other suitable component. The aperture 62 provides an opening through which fuel may be added to or removed from the fuel structure 24, as well as allowing components to be inserted into the fuel structure 24. In some embodiments, the flange 56 may, but not necessarily, include mechanical coupling projections 64 that provide locations for a component to be mounted to the flange 56.

In normal operation, as discussed above and as shown in FIG. 4, the sump cavity 14 forms the lowest surface within the fuel structure 24. Because the sump cavity 14 may extend past the lower surface 72 of the vehicle structure 70, an impact force may be applied to the sump cavity 14 when the aircraft or land vehicle experiences a crash impact. As shown in FIG. 5, the flexible design of the sump cavity 14 and the platform 12 allow the walls 66 of the sump cavity 14 to bend in response to the impact force so that the sump cavity 14 may retract at least partially within the recessed area 36, the aperture 74, and/or into the fuel structure 24. In other embodiments that do not include a recessed area 36, the sump cavity 14 may retract at least partially within the aperture 74 and/or the fuel structure 24.

Also, because the sump cavity 14 and the platform 12 are formed of flexible materials instead of metallic parts, the flexible sump 10 does not crack or otherwise allow fuel to leak out of the flexible sump 10. As a result, the deformable design of the flexible sump 10 meets crashworthy regulations CS 29 and 27 regarding the drop test aspect. In some embodiments, the flexible design of the sump cavity 14 and the platform 12 allow the sump cavity 14 to also protect the bleed valve or other component that may be attached to the flexible sump 10 by retracting the bleed valve or other component at least partially within the recessed area 36, the aperture 74, and/or the fuel structure 24. In other embodiments that do not include a recessed area 36, the bleed valve or other component may be retracted at least partially within the aperture 74 and/or the fuel structure 24.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A flexible sump comprising:
a sump cavity comprising flexible walls;
a flange comprising a coupling section and an exposed section;
a platform coupled to an upper edge of the sump cavity; and
a support structure coupled to the platform and the coupling section of the flange,
wherein the flange is positioned adjacent the upper edge of the sump cavity so that the flange and the sump cavity are configured to mate with separate and adjacent apertures in a lower surface of a fuel structure, and the flange is configured to provide an access point to the fuel structure.

2. The flexible sump of claim 1, wherein the flexible walls are configured to bend when a force is applied to a lower surface of the sump cavity.

3. The flexible sump of claim 2, wherein the lower surface of the sump cavity is configured to bend when the force is applied to the lower surface of the sump cavity.

4. The flexible sump of claim 1, further comprising at least two coupling tabs that are coupled to the platform and are configured to couple the platform to the lower surface of the fuel structure.

5. The flexible sump of claim 4, wherein the separate and adjacent apertures in the lower surface of the fuel structure comprise a sump aperture and a flange aperture, wherein the sump aperture is configured to surround the flexible walls of the sump cavity and the flange aperture is configured to correspond to a shape of the exposed section of the flange when the platform is coupled to the lower surface of the fuel structure.

6. The flexible sump of claim 5, wherein a lower surface of the sump cavity is positioned below the lower surface of the fuel structure when the platform is coupled to the lower surface of the fuel structure.

7. The flexible sump of claim 6, wherein the lower surface of the sump cavity is positioned below a lower surface of a vehicle structure when the fuel structure is coupled to the lower surface of the vehicle structure.

8. The flexible sump of claim 6, wherein the flexible walls are configured to bend when a force is applied to the lower surface of the sump cavity so that the lower surface of the sump cavity is positioned at least partially within the fuel structure.

9. The flexible sump of claim 1, wherein the exposed section of the flange is configured to couple to a fuel pump or a fuel probe.

10. A flexible sump comprising:
    a sump cavity comprising flexible walls and a flexible lower surface;
    an interface coupled to the flexible lower surface of the sump cavity;
    a platform coupled to an upper edge of the sump cavity; and
    a flange coupled to the platform via a support structure and positioned adjacent the upper edge of the sump cavity;
    wherein the flange and the sump cavity are configured to mate with separate and adjacent apertures in a lower surface of a fuel structure, and the flange is configured to provide an access point to the fuel structure.

11. The flexible sump of claim 10, wherein the flexible walls and the flexible lower surface are configured to bend when a force is applied to the flexible lower surface of the sump cavity.

12. The flexible sump of claim 10, further comprising at least two coupling tabs that are coupled to the platform and are configured to couple the platform to the lower surface of the fuel structure.

13. The flexible sump of claim 12, wherein one of the separate and adjacent apertures in the lower surface of the fuel structure comprises a sump aperture, wherein the sump aperture is configured to surround the flexible walls of the sump cavity when the platform is coupled to the lower surface of the fuel structure.

14. The flexible sump of claim 13, wherein the flexible lower surface of the sump cavity is positioned below the lower surface of the fuel structure when the platform is coupled to the lower surface of the fuel structure.

15. The flexible sump of claim 13, wherein the lower surface of the sump cavity is positioned below a lower surface of a vehicle structure when the fuel structure is coupled to the lower surface of the vehicle structure.

16. The flexible sump of claim 14, wherein the flexible walls are configured to bend when a force is applied to the lower surface of the sump cavity so that the lower surface of the sump cavity is positioned at least partially within the fuel structure.

17. The flexible sump of claim 10, wherein the interface is configured to couple to a bleed valve or a drain valve.

18. A fuel structure comprising:
    a lower surface comprising a sump aperture and a separate flange aperture that is adjacent the sump aperture;
    a flexible sump comprising:
        a sump cavity comprising flexible walls and a flexible lower surface, wherein the sump cavity is positioned within the sump aperture so that the flexible lower surface is positioned below the lower surface of the fuel structure;
        an interface coupled to the flexible lower surface of the sump cavity;
        a platform comprising coupling tabs, wherein the platform is coupled to an upper edge of the sump cavity and wherein the coupling tabs couple the platform to the lower surface of the fuel structure; and
        a flange coupled to the platform via a support structure and positioned adjacent the upper edge of the sump cavity, wherein the flange is coupled to the flange aperture to provide an access point to the fuel structure.

19. The fuel structure of claim 18, wherein the flexible walls are configured to bend when a force is applied to the flexible lower surface of the sump cavity.

20. The fuel structure of claim 19, wherein the lower surface of the sump cavity is positioned at least partially within the fuel structure when the flexible walls are bent.

21. The flexible sump of claim 18, wherein the interface is configured to couple to a bleed valve or a drain valve.

22. The flexible sump of claim 18, wherein the flange further comprises a coupling section and an exposed section, and the support structure is coupled to the coupling section of the flange and the platform.

* * * * *